Oct. 12, 1954  E. R. KEBBON  2,691,461
INSTRUMENT CASE
Filed Sept. 19, 1951
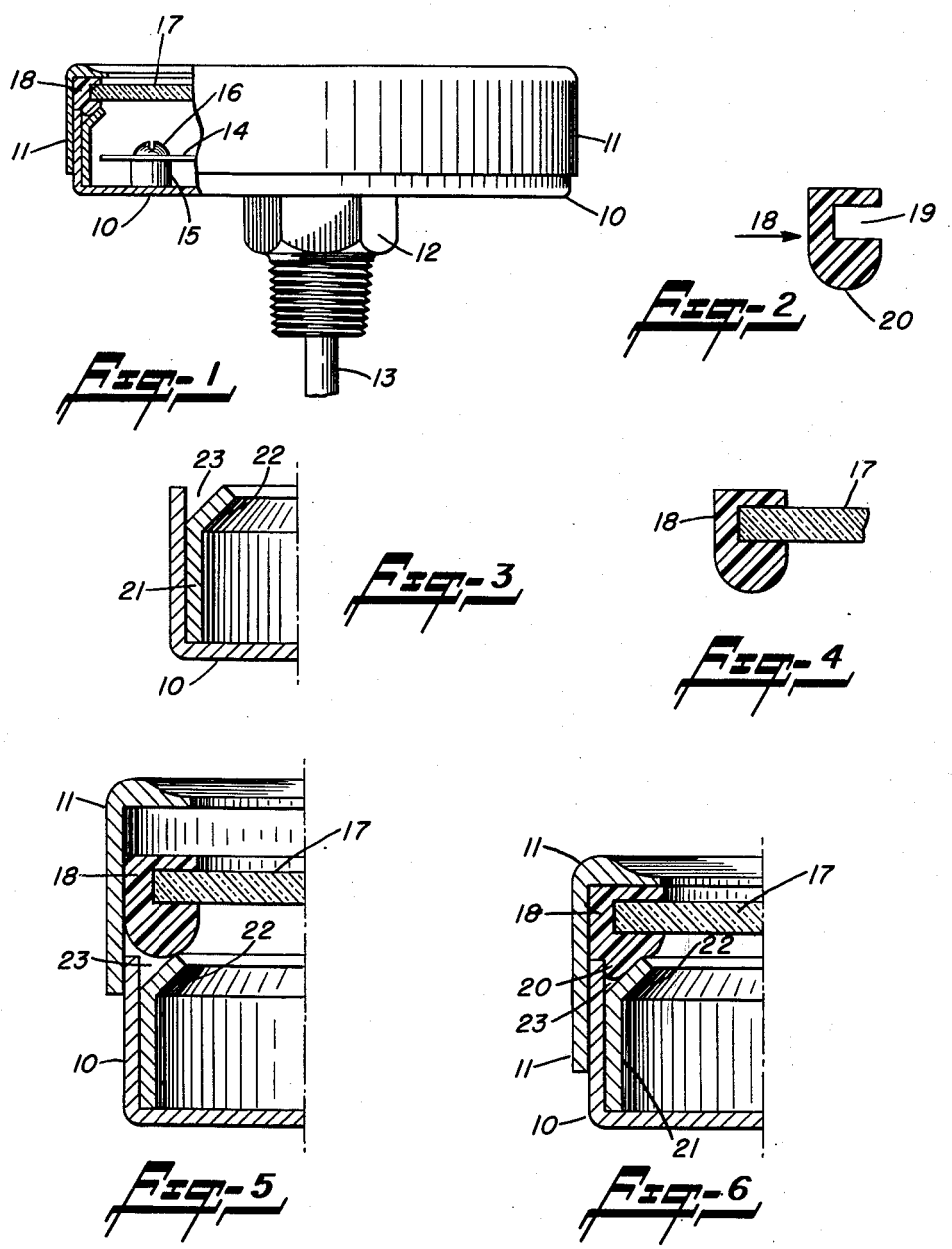
EARL R. KEBBON
INVENTOR.

Patented Oct. 12, 1954

2,691,461

UNITED STATES PATENT OFFICE 2,691,461

INSTRUMENT CASE

Earl R. Kebbon, Chatham, N. J., assignor to Weston Electrical Instrument Corporation, Newark, N. J., a corporation of New Jersey Application September 19, 1951, Serial No. 247,286

1 Claim. (Cl. 220—82)

This invention relates to an instrument case and more particularly to a gasket of novel configuration adapted for use with thin-walled cases.

In a thin-walled case, such as used for bimetallic thermometers and the like, there exists the problem of making the case water tight without resort to solder sealing, metalizing, etc. When using compressive type gaskets for this purpose the problem is aggravated by the fact that such cases include a transparent cover, or window, affording a clear view of the instrument scale plate and pointer.

An object of this invention is the provision of a unitary gasket of novel configuration for use with thin-walled metal cases that include a viewing window.

An object of this invention is the provision of a gasket of novel cross-sectional configuration in combination with a novel bezel whereby a thin-walled instrument case can be made water tight.

An object of this invention is the provision of a thin-walled, water tight instrument casing having a viewing window and provided with a unitary gasket, a cooperating bezel, and a clamping ring whereby a satisfactory, water-tight seal is provided between the individual parts of the case proper.

These and other objects and advantages will be apparent from the following description when taken with the accompanying drawings illustrating the invention.

In the drawings wherein like reference characters denote like parts in the several views:

Figure 1 is a fragmentary view, with certain parts shown in section, of a thermometer case;

Figure 2 is a transverse section of my novel gasket, drawn to an enlarged scale;

Figure 3 is a fragmentary, enlarged, sectional view showing the case wall and the bezel;

Figure 4 is a fragmentary, sectional view showing how the viewing window fits within a channel in the gasket;

Figure 5 is a fragmentary, sectional view showing the relative disposition of the parts in the assembly of the case and prior to compression of the gasket; and Figure 6 is similar to Figure 5 but showing the clamping ring in final position wherein the gasket is subjected to compressive forces to provide a water tight joint.

Referring now to Figure 1, a bimetallic thermometer case comprises the thin-walled base 10, and the cover, or clamping ring, 11. Secured to the base 10 is a conventional nut 12 through which passes the stem 13 of the thermometer. As is well known, the stem houses the bimetallic element and connected staff, said staff carrying a pointer that cooperates with a scale of temperature graduations carried by a scale plate 14 normally held in fixed position, as by the post 15 and screw 16. It will be apparent that to provide a water tight case a suitable seal must be provided between the clamping ring 11 and the transparent viewing window 17, and between the clamping ring and the side wall of the base 10.

I accomplish such sealing of the necessary joints by means of a unitary, circular gasket having a novel configuration in transverse section. Figure 2 illustrates the configuration of such gasket 18, in transverse section. It will be noted the gasket is a combination of a "channel" gasket and an "O ring" gasket. Specifically, the gasket 18 includes a circumferential recess or channel 19 and a solid hemispherical section 20. Such gasket is made in a single piece by a molding process, the preferred material being rubber. In practice the diameter of the gasket is made so that the gasket will fit snugly over the cover glass 17, peripherally, as shown in Figure 4. Even though the gasket be made to fit rather snugly over the edge of the cover glass, it can readily be inserted into position by reason of its elasticity.

Reference is now made to Figure 3 showing the side wall of the base 10 and a circular, metal bezel 21. It will be noted the bezel rests upon the base 10 and its outer diameter conforms substantially to the inner diameter of the case wall. Generally, the bezel is made of spring material for added strength. The bezel 21 is provided with an inwardly sloping end section 22 which forms a V-shaped chamber 23 with the side wall of the base, as shown. This inwardly sloping section of the bezel also materially increases the resistance of the bezel to buckling when pressures are applied thereto.

As shown in Figure 5, the assembly of the gasket 18 and glass 17 is placed over the bezel-case such that the hemispherical portion of the gasket is supported immediately over the V-shaped chamber 23 formed between the bezel and base wall. Next, the clamping ring 11 (actually the case cover), is inserted into position. When the clamping ring is pressed downwardly into final position, preferably by placing the device in a suitable press, the gasket is subjected to considerable compression. Such pressure, exerted against the gasket by a clamping ring, causes the gasket to form a positive seal at all critical points, as shown in Figure 6. Specifically, the hemispherical portion 20 of the gasket is squeezed into the V-shaped chamber 23 forcing the upper edge of the base wall outwardly against the cover 11. At the same time, the gasket is firmly pressed against the edge of the base wall thereby further preventing entrance of water into the case between the case wall and bezel wall. Also, those portions of the gasket peripherally overlying the glass 17 are firmly pressed against the glass preventing the entrance of moisture peripherally of the glass. Still further, the gasket exerts a force against the bezel itself thereby maintaining the bezel in position and sealing off the joint between the gasket and the bezel.

Having now described my invention it is apparent I provide a simple, novel means for sealing a thin-walled case, the entire assembly being held together by friction.

I claim:

A case comprising a cup-shaped base; a bezel resting on the bottom of the base and disposed against the inner side wall of the base; said bezel having an inwardly sloping end section that forms a substantially V-shaped chamber with the side wall of the base; a unitary resilient gasket including a rectangular section having an inwardly-directed circular channel therein and a hemispherical section, said hemispherical section having a normal diameter exceeding the maximum radial width of the said chamber and being disposed partially within the said V-shaped chamber; a transparent cover closing the open side of the base, said cover being peripherally disposed within the circular channel of the gasket; and a clamping ring force-fitted over the open end of the base, said ring having an inwardly-extending flat section contacting one flat surface of the gasket and a side wall overlying the outer side wall of the base, the recited arrangement being such that when the clamping ring is in place the hemispherical portion of the gasket is deformed to overlie the end of the case and the end of the sloping bezel section.

References Cited in the file of this patent

UNITED STATES PATENTS

| Number | Name | Date |
|---|---|---|
| 116,272 | Collins et al. | June 27, 1871 |
| 2,056,024 | Stuart | Sept. 29, 1936 |
| 2,317,213 | Oliver | Apr. 20, 1943 |
| 2,599,212 | Triplett | June 3, 1952 |